US009852430B2

(12) United States Patent
Zhou et al.

(10) Patent No.: US 9,852,430 B2
(45) Date of Patent: Dec. 26, 2017

(54) DYNAMIC GENERATION OF ADVERTISEMENT TEXT

(75) Inventors: Ming Zhou, Beijing (CN); Cheng Niu, Beijing (CN); Zhaohui Tang, Bellevue, WA (US); Ying Li, Bellevue, WA (US); Chin-Yew Lin, Beijing (CN); Li Li, Issaquah, WA (US); Brian Burdick, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2562 days.

(21) Appl. No.: 11/538,309

(22) Filed: Oct. 3, 2006

(65) Prior Publication Data

US 2008/0082410 A1 Apr. 3, 2008

(51) Int. Cl.
*G06Q 30/00* (2012.01)
*G06Q 30/02* (2012.01)

(52) U.S. Cl.
CPC ......... *G06Q 30/02* (2013.01); *G06Q 30/0242* (2013.01); *G06Q 30/0255* (2013.01); *G06Q 30/0261* (2013.01); *G06Q 30/0269* (2013.01); *G06Q 30/0276* (2013.01)

(58) Field of Classification Search
CPC ...................... G06Q 30/0241; G06Q 30/0251
USPC ......................................................... 705/14
See application file for complete search history.

(56) References Cited

U.S. PATENT DOCUMENTS

| | | | |
|---|---|---|---|
| 6,572,662 B2 | 6/2003 | Manohar et al. | |
| 6,633,850 B1 | 10/2003 | Gabbard et al. | |
| 6,654,725 B1 | 11/2003 | Langheinrich et al. | |
| 6,898,571 B1 | 5/2005 | Val et al. | |
| 6,993,568 B1 | 1/2006 | Hauduc et al. | |
| 7,028,072 B1 | 4/2006 | Kliger et al. | |
| 7,076,244 B2* | 7/2006 | Lazaridis et al. | 455/414.2 |
| 2002/0052925 A1* | 5/2002 | Kim et al. | 709/217 |
| 2002/0111994 A1* | 8/2002 | Raghunandan | 709/203 |
| 2002/0164004 A1* | 11/2002 | Tamura et al. | 379/93.12 |

(Continued)

OTHER PUBLICATIONS

Robert Dale, Stephen J. Green, Maria Milosavljevic, Cecile Paris, Cornelia Verspoor and Sandra Williams, "Dynamic Document Delivery: Generating Natural Language Texts on Demand," MRI Language Technology Group, Macquarie University, Sydney NSW 2109 Australia, CSIRO Mathematical and Information Sciences, Locked Bag 17, North Ryde NSW 1670 Australia.

(Continued)

*Primary Examiner* — Matthew L Hamilton
(74) *Attorney, Agent, or Firm* — Shook Hardy & Bacon L.L.P.

(57) ABSTRACT

Systems, methods, and computer-readable media for dynamically generating text associated with an advertisement are provided. Core text associated with an advertisement is received from an advertiser, as is at least one attribute relevant to the advertiser and/or a user. Based upon the received attribute(s), it is determined whether customization of the core text is desired. If customization is desired, the core text is modified and presented in association with the advertisement. If customization is not desired, the core text is presented in association with the advertisement. In one embodiment, target advertisement placement information may also be utilized to determine whether customization of the core text is desired.

20 Claims, 5 Drawing Sheets

(56) References Cited

U.S. PATENT DOCUMENTS

| | | | |
|---|---|---|---|
| 2002/0193983 A1 | 12/2002 | Tokieda et al. | |
| 2003/0195802 A1* | 10/2003 | Hensen | G06Q 30/0241 |
| | | | 705/14.4 |
| 2004/0103026 A1 | 5/2004 | White | |
| 2004/0260767 A1 | 12/2004 | Kedem et al. | |
| 2005/0144073 A1* | 6/2005 | Morrisroe et al. | 705/14 |
| 2005/0149395 A1 | 7/2005 | Henkin et al. | |
| 2005/0222989 A1 | 10/2005 | Haveliwala et al. | |
| 2006/0116924 A1 | 6/2006 | Angles et al. | |
| 2006/0150088 A1* | 7/2006 | Kraft | G06F 17/248 |
| | | | 715/249 |
| 2006/0224583 A1* | 10/2006 | Fikes | G06F 17/30876 |
| 2006/0224938 A1* | 10/2006 | Fikes | G06F 17/30876 |
| | | | 715/234 |
| 2006/0277105 A1* | 12/2006 | Harris | 705/14 |
| 2006/0293949 A1* | 12/2006 | Grossnickle et al. | 705/14 |
| 2007/0038634 A1* | 2/2007 | Glover et al. | 707/10 |
| 2008/0059312 A1* | 3/2008 | Gern | G06Q 30/02 |
| | | | 705/14.72 |
| 2008/0059884 A1* | 3/2008 | Ellis | H04N 5/44543 |
| | | | 715/721 |

OTHER PUBLICATIONS

"Basis Technology Powers Mooter's Contextual Advertising Targeting Platform in Asian Markets," Rosette Linguistics Platform, Cambridge, Massachusettes and Sydney, Augstralia, Apr. 26, 2006.
Gilad Mishne and Maarten De Rijke, "Language Model Mixtures for Contextual Ad Placement in Personal Blogs," ISLA, University of Amsterdam, Kruislaan 403, 1098 SJ Amsterdam, The Netherlands.

\* cited by examiner

DYNAMIC GENERATION OF ADVERTISEMENT TEXT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Traditionally, text associated with advertisements, e.g., advertisements displayed in association with web pages, is manually generated by individuals, typically an advertiser associated with the advertisement or an advertising agency. Accordingly, each time an advertiser desires to target a different audience, promote a different product, and advertise a particular promotion, or the like, the text associated with the advertisement must be rewritten manually. This can be a very inflexible and costly process. The problem is exacerbated for advertisements presented in association with web pages due, in part, to the rapid growth of the Internet and the many new web pages created on a daily basis. Unlike other forms of advertising (e.g., television advertising), the revenue generated by advertising on the web does not generally justify the expense of customizing advertisement text for each web page in association with which it is presented or for each user to whom the advertisement is presented. Static text in advertisements, however, often fails to maximize the utility and potential value of an otherwise effective advertisement.

SUMMARY

Embodiments of the present invention provide systems, methods, and computer-readable media for dynamically generating text associated with advertisements. In one embodiment, a core message is received, e.g., from an advertiser. One or more attributes relevant to the advertiser and/or a user (e.g., a potential client of the advertiser) are also received and it is determined, based upon the attribute(s), whether customization of the core text is desirable. If it is determined that customization is desirable, modified text may be dynamically generated, for instance, utilizing one or more natural language models, and the modified text may be presented in association with an advertisement. If, on the other hand, it is determined that customization is not desirable, the core text may be presented in association with an advertisement.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
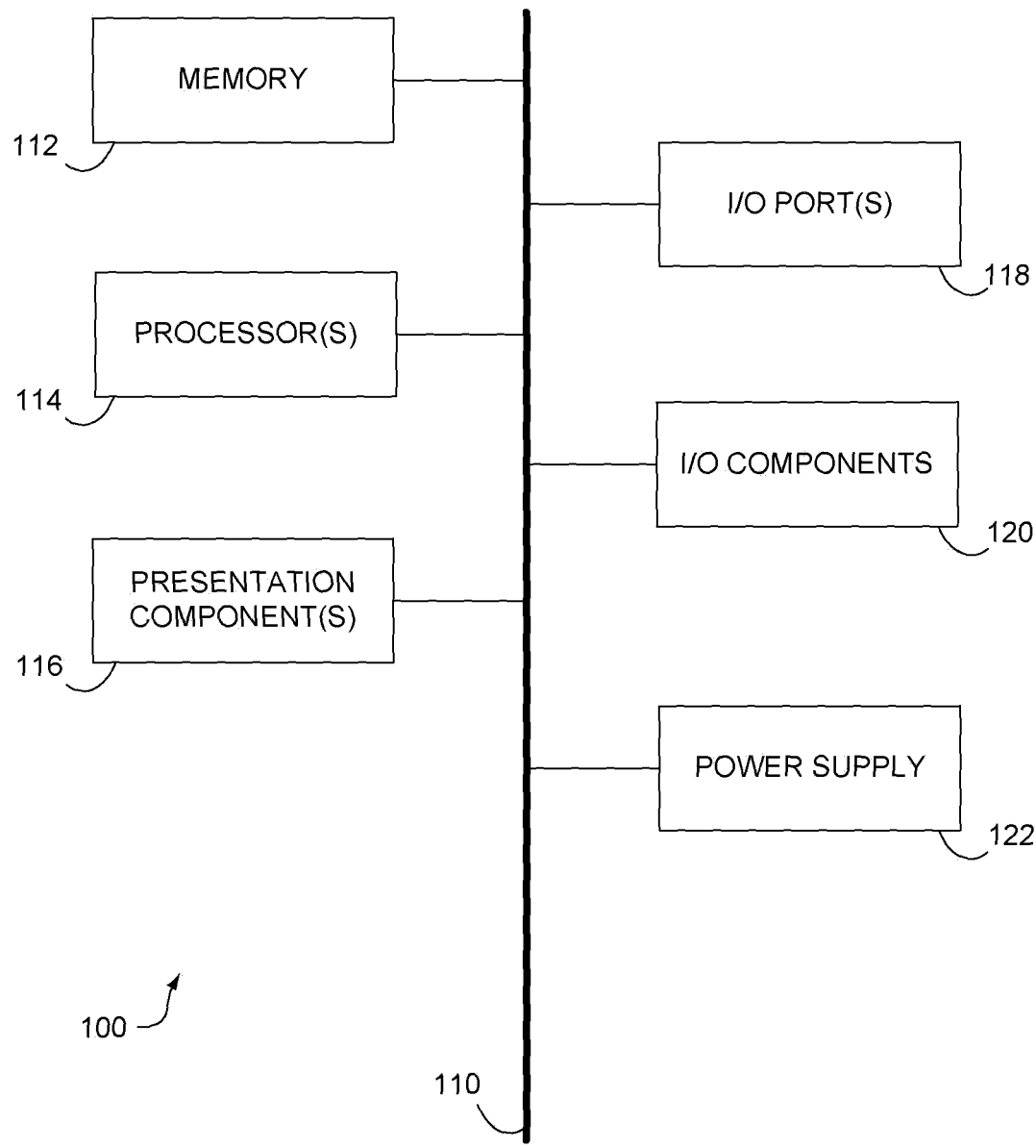
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for dynamically generating text associated with advertisements. In one embodiment, a core message is received, e.g., from an advertiser. One or more attributes relevant to the advertiser and/or a user (e.g., a potential client of the advertiser) are also received and it is determined, based upon the attribute(s), whether customization of the core text is desirable. If it is determined that customization is desirable, modified text may be dynamically generated, for instance, utilizing one or more natural language models, and the modified text may be presented in association with an advertisement. If, on the other hand, it is determined that customization is not desirable, the core text may be presented in association with an advertisement.

Accordingly, one embodiment of the present invention is directed to one or more computer-readable media having computer-executable instructions for performing a method for dynamically generating text associated with an advertisement. The method includes receiving core text associated with an advertisement, receiving at least one attribute relevant to one of a user and an advertiser associated with the advertisement, and determining, based on the received attribute, whether customization of the core text is desirable.

In another embodiment, the present invention is directed to a method for dynamically generating text associated with an advertisement. The method includes receiving core text and an advertiser profile associated with the advertisement, determining attributes associated with an active user in accordance with the advertiser profile, generating to-bepresented text utilizing the core text and the determined user attributes, and presenting the to-be-presented text in association with the advertisement.

In yet another embodiment, the present invention is directed to a system for dynamically generating text associated with an advertisement. The system includes at least one database and a text authoring engine. The at least one database is configured to store information associated with at least one of a user and an advertiser. The text authoring engine is configured to dynamically generate text associated with the advertisement utilizing at least a portion of the stored information.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
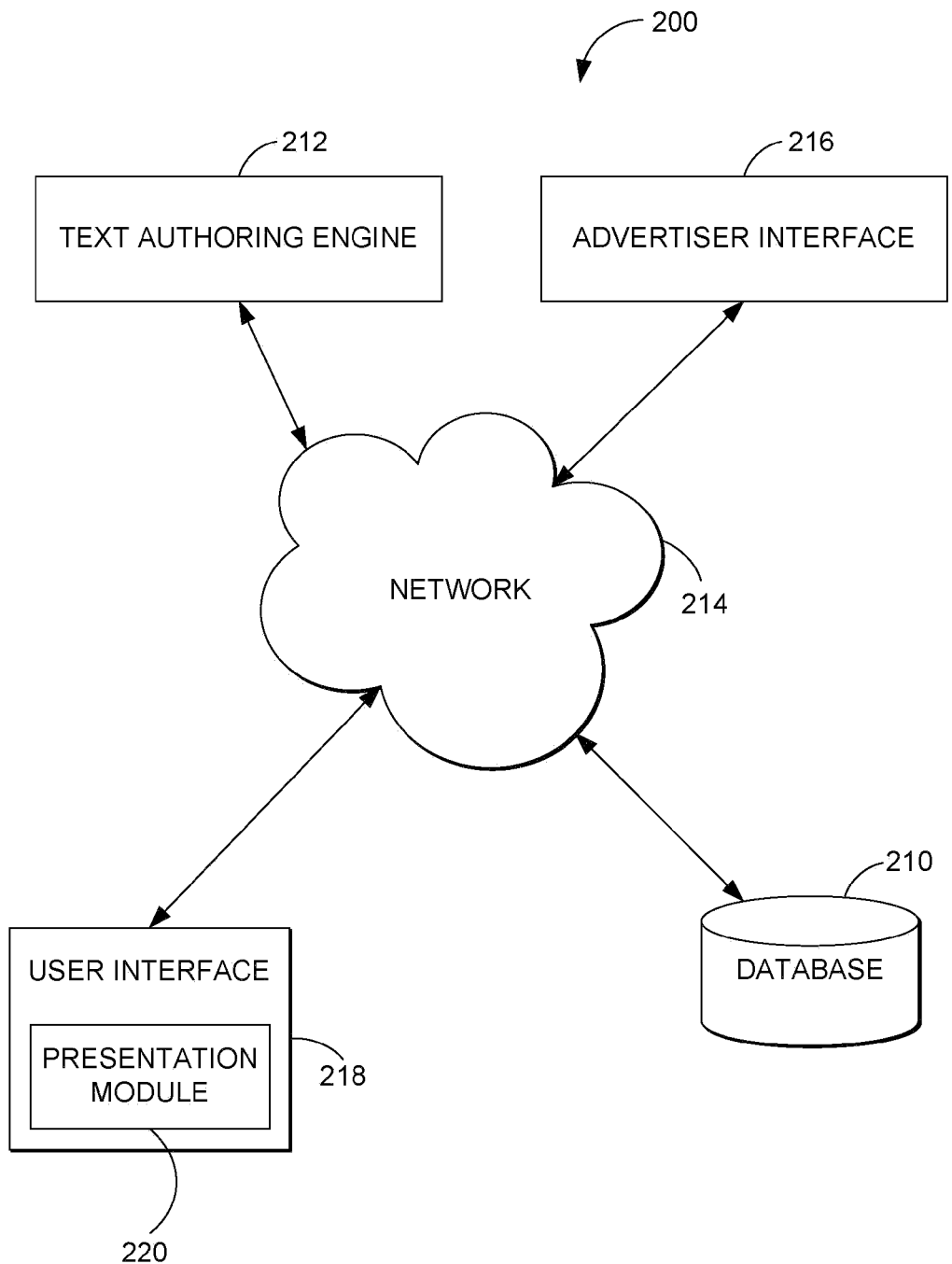
FIG. 2 is a block diagram illustrating an exemplary system for dynamically generating text associated with an advertisement, in accordance with an embodiment of the present invention.

Turning now to FIG. 2, a block diagram is provided illustrating an exemplary system 200 for dynamically generating text associated with an advertisement, in accordance with an embodiment of the present invention. The system 200 includes one or more databases 210 and a text authoring engine 212 in communication with one another via a network 214. The network 214 may include, without limitation, one or more local area networks (LANs) and/or wide area networks (WANs). Such networking environments are commonplace in offices, enterprise-wide computer networks, intranets, and the Internet. Accordingly, the network 214 is not further described herein.

The database(s) 210 is configured to store information associated with at least one of a user and an advertiser. In embodiments, such information may include, without limitation, one or more user behavior attributes, one or more environmental attributes, one or more user demographic attributes, and one or more advertiser attributes. User behavior attributes may include, by way of example only, a user's Internet browsing history, a user's Internet search history, a user's online purchasing history, a user's online publishing history, a user's online investment history, and a user's online membership activities. Environmental attributes may include, without limitation, a time of day, a day of the week, a day of the month, a month of the year, a season, the content of one or more active websites, and the user's geographic location. User demographic attributes may include, by way of example only, a user's age, a user's gender, a user's income, a user's marital status, a user's race, a user's nationality, a user's primary spoken language, information indicative of a user's interests, and a user's occupation. Advertiser attributes may include, without limitation, an advertiser's industry, an advertiser's geographic location, and an advertiser's target demographic associated with a particular advertisement. It will be understood and appreciated by those of ordinary skill in the art that the information stored in the database(s) 210 may be configurable and may include any information relevant to the text associated with an advertisement and/or the placement thereof. The content and volume of such information are not intended to limit the scope of embodiments of the present invention in any way.

The text authoring engine 212 is configured to dynamically generate text associated with an advertisement utilizing at least a portion of the information stored in database(s) 210. In embodiments, the text authoring engine 212 utilizes one or more natural language models. Such natural language models are known to those of ordinary skill in the art and, accordingly, are not further described herein. The text authoring engine 212 may be further configured to determine whether customization of core text associated with an advertisement is desirable. Customization may include, by way of example only, customization of the text itself, customization of the presentation of the text (e.g., font size, font type, capitalization, text placement, and the like), or any combination thereof. Such determination may be made utilizing information stored in the database(s) 210, such information typically being provided by way of one or more parameters by the advertiser or other entity wishing the advertisement and associated text to be displayed. In embodiments, the text authoring engine 212 may be also configured to present dynamically-generated text, and/or associated advertisements, in multiple languages.

The system 200 further includes an advertiser interface 216 and a user interface 218 in communication with one another (and the database(s) 210 and text authoring engine 212) via the network 214. Each of the advertiser interface 216 and the user interface 218 may be associated with any type of computing device, such as computing device 100 described with reference to FIG. 1, for example. The user interface 218 further includes at least one presentation module 220 configured to present (e.g., display) dynamically-generated text in association with an advertisement. In this regard, presentation module 220 may be configured to receive target advertisement placement information, for instance, from advertiser interface 216 and/or database(s) 210, and utilize such target advertisement placement information upon presenting dynamically-generated text and advertisements. Such embodiments are more fully described herein below with reference to FIG. 3. Additionally, other components not shown may also be included within the system 200. Further, additional components not shown may also be included within any of the database(s) 210, the text authoring engine 212, the advertiser interface 216, and the user interface 218. Any and all such variations are contemplated to be within the scope of embodiments hereof.

In some embodiments (not shown), the text authoring engine 212 may be configured to communicate directly with the advertiser interface 216, the user interface 218, and/or the database(s) 210.

Figure 3:
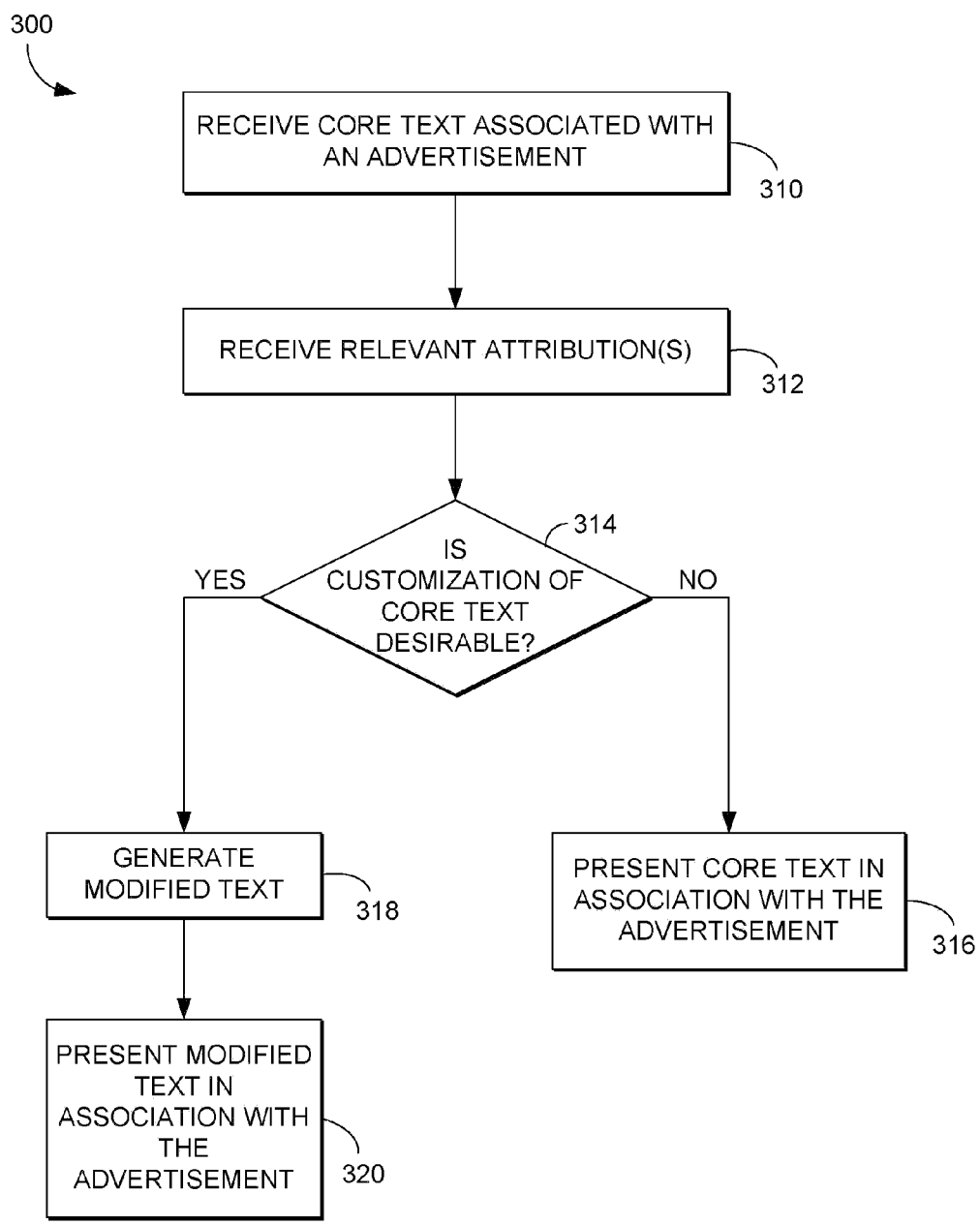
FIG. 3 is a flow diagram illustrating an exemplary method for dynamically generating text associated with an advertisement, in accordance with an embodiment of the present invention.

Turning now to FIG. 3, a flow diagram of an exemplary method for dynamically generating text associated with an advertisement, in accordance with an embodiment of the present invention, is illustrated and designated generally as reference numeral 300. At block 310, core text associated with an advertisement is received. By way of example, the core message may be a default message provided by an advertiser with which the advertisement is associated. In some embodiments, the core text comprises information that is static with respect to the advertisement, such as the name of a service or product, the price of a service or product, a generic promotional message associated with a product or service, and/or any combination thereof. For example, the core text associated with an advertisement for a particular travel service may consist of a price of an airline ticket for traveling between two cities (for instance, New York and Chicago) and a promotional content indicating a time period during which a 20% discount on the airfare is available (e.g., during the month of September). In embodiments, the core text may also include default or static features related to the presentation of the text, e.g., font size, font type, capitalization, and the like. For example, the core text associated with the above described advertisement may include text primarily in lower case letters with only the first word of each sentence being capitalized, each of the letters appearing in Arial font. In embodiments, the core text may also include information related to the placement of the text in association with the context in which it is to be presented (as more fully described below). For instance, an advertisement may always be presented along the left hand side of a display pane unless one or more threshold parameters (e.g., click-through-rates, bidding price, etc.) are satisfied.

Next, as indicated at block 312, one or more attributes relevant to a user and/or an advertiser associated with the advertisement is received. In embodiments, login information may be used to identify users, as well as users' relevant attributes. For example, most modern operating systems provide multi-user environments. Many web services require their users to identify themselves using personalized login information as well. Attributes relevant to an advertiser may be identified and received, for instance, utilizing an advertiser profile input via advertiser interface 216 of FIG. 2. User and/or advertiser attributes may be stored in one or more databases (e.g., database 210 of FIG. 2). Examples of user and/or advertiser attributes are described herein above with reference to FIG. 2.

Next, as indicated at block 314, it is determined whether customization of the core text is desired. Customization may be determined to be desired, for instance, if the received attributes indicate a particular characteristic of the user that the advertiser has indicated warrants specialized text. If, however, a user is void of any particular called-out characteristics, customization may be determined to be undesirable. Customization may also be determined to be desired, for instance, if one or more parameters (e.g., click-through-rate, bidding price, etc.) exceeds a certain threshold and/or based upon presentation position of the text. Any and all such variations are contemplated to be within the scope of embodiments of the present invention.

If it is determined at block 314 that customization is not desired, the core text is presented in association with the advertisement, as indicated at block 316. If, however, it is determined at block 314 that customization is desired, modified text is dynamically generated, as indicated at block 318. Modified text may include not only modifications in the text itself but also in the presentation thereof (e.g., font size, font type, capitalization, and the like). In some embodiments, the modified text is generated utilizing one or more natural language models, as described above. Subsequently, the modified text is presented in association with the advertisement, as indicated at block 320.

The core and/or dynamically-generated modified text may be presented in a variety of ways. For instance, the dynamic text message may be displayed in a popup window, presented through an overlay window or through a text line within a media play window, via an email displaying the text message as the subject line sent to the user, and/or presented verbally through a system speaker. Any and all such variations, and any combination thereof, are contemplated to be within the scope of embodiments hereof.

An example is provided below to illustrate the method described above. Suppose a user who lives in Seattle, and whose name is Tom, is browsing a web page that describes a wonderful travel experience in Maui, Hi. in a fine day in the month of June. Suppose further that an airline advertiser has previously provided a basic default message (i.e., core text) as: "Great vacation in % LOCATION %; Book your flight today!" where % LOCATION % is a place holder. Suppose that the airline advertiser additionally provided an associated advertiser profile that contains a set of provisions including a promotional 50% discount during the summer months (June, July, and August). By obtaining the user's name, date, month, season of the year, and the content of the web page that Tom is browsing, the core text may be customized as "Tom's great summer vacation in Maui; Book your 50% discount Seattle-Maui flight today!" Furthermore, if Tom has found the web page after having entered a search keyword "Maui" from a foreign language web page, a foreign language version of the text for the airline advertiser may be presented to Tom.

Figure 4:
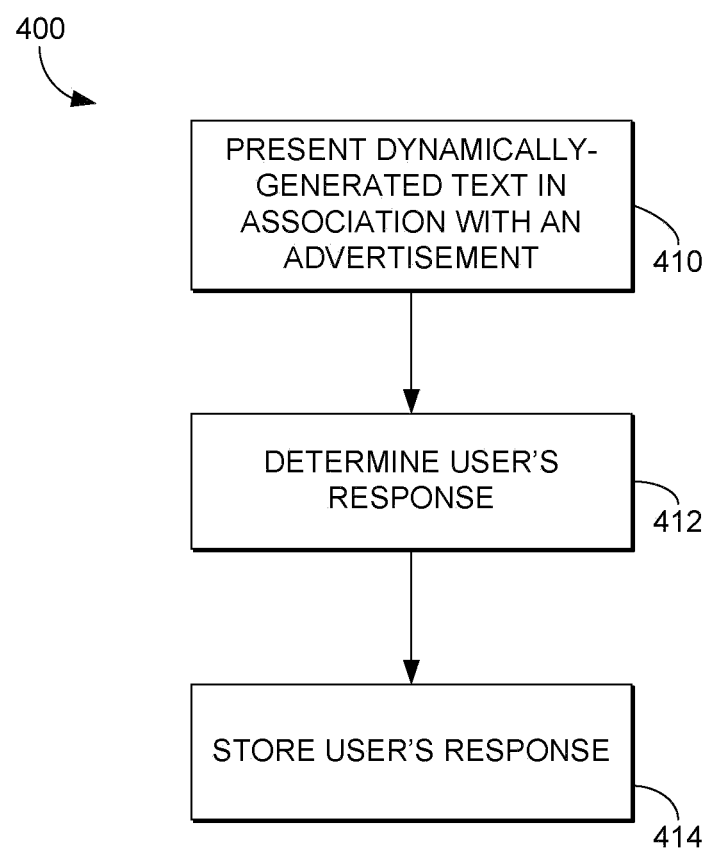
FIG. 4 is a flow diagram illustrating an exemplary method for utilizing a user's response to dynamically-generated advertisement text to create a user behavior attribute, in accordance with an embodiment of the present invention.

Turning now to FIG. 4, a flow diagram of an exemplary method for utilizing a user's response to dynamically-generated advertisement text to create a user behavior attribute, in accordance with an embodiment of the present invention, is illustrated and designated generally as reference numeral 400. Initially, as indicated at block 410, dynamically-generated text and an associated advertisement are presented to a targeted user. As indicated at block 412, the user's response to the text/advertisement is then determined. For instance, the user may ignore the advertisement or the user may follow up and click on the message. Additionally, the user may follow up by clicking on the message to see a web site that presents services or products and make online purchases thereof. As indicated at block 414, the user's response may subsequently be stored, for instance, in database 210 of FIG. 2. In one embodiment, the user's response may be stored as a user behavior attribute that may be accessible by the same and/or other advertisers the next time the user accesses a site having potentially customizable advertisement text associated therewith.

For instance, Jerry logs into an established account and performs a buyer's search for a novel by Tom Clancy and a DVD set for the famous HBO miniseries "Band of Brothers." The accessed web site, based on Jerry's buyer search history, presents items that may be interest to Jerry that are placed for online auctions. As the items are made available, advertisements may be emailed to Jerry with the subject lines that describe each of the items and a message body that contains detailed service or product information associated with the items. Jerry then sees the subject lines and determines whether to open each of the emails. As Jerry opens some emails while deleting other emails without opening them, the associated service may monitor and record Jerry's decisions and use the information associated with Jerry's selection to fine-tune the categories of items for subsequent emails.

Figure 5:
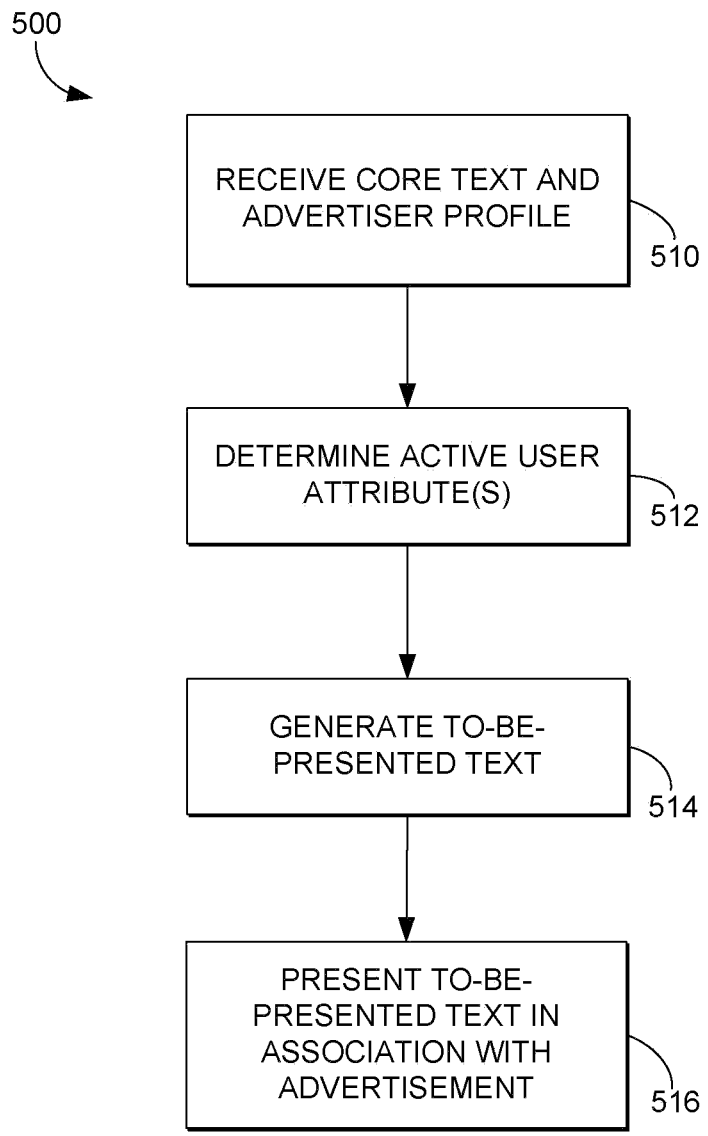
FIG. 5 is a flow diagram illustrating a method for dynamically generating text associated with an advertisement and presenting the dynamically-generated text to a user, in accordance with an embodiment of the present invention.

Turning now to FIG. 5, a flow diagram is illustrated showing a method 500 for dynamically generating text associated with an advertisement and presenting the dynamically-generated text to a user, in accordance with an embodiment of the present invention. Initially, as indicated at block 510, core text associated with an advertisement and an advertiser profile are received. In some embodiments, the advertiser profile contains one or more of the main purpose of the advertisement, a targeted class of users to whom it is desired for the advertisement (and associated text) to be displayed, an advertising budget, a particular nature of the advertised service or product, and/or any combination thereof. In such embodiments, the content of the advertiser profile is referenced such that the text associated with an advertisement may be dynamically generated in accordance with the guidelines suggested by the profile content, as more fully described below.

Subsequently, as indicated at block 512, one or more user attributes are determined. Such determination is discussed more fully herein above with reference to FIG. 3. Next, to-be-presented text is generated, as indicated at block 514. If the user attributes indicate a characteristic designated to be desirable to the advertiser associated with the advertisement, the to-be-presented text may be dynamically-generated in a customized fashion. If, on the other hand, the user attributes do not indicate specified characteristics, core text associated with the advertisement may comprise the to-be-presented text.

Next, as indicated at block 516, the to-be-presented text is presented in association with the advertisement. Methods of presentation are discussed herein above with reference to FIG. 3.

It will be understood and appreciated by those of ordinary skill in the art that the particular pre-determined commands described herein are presented by way of example only and are not intended to limit the scope of embodiments of the present invention in any way.

Embodiments of the present invention provide systems, methods, and computer-readable media for dynamically generating text to be presented in association with advertisements. The systems, methods, and computer-readable media disclosed herein provide, among other things, ways to dynamically generate advertisement text based on a core message and preferences and interests of individual users as well as temporal, seasonal, and other additional environmental factors.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. One or more computer storage memory hardware devices having computer-executable instructions embodied thereon that, when executed, cause one or more processors to perform a method for dynamically generating text associated with an advertisement, the method comprising:

obtaining a first user attribute corresponding to online activity of a first user and a second user attribute corresponding to online activity of a second user;

receiving from an advertiser through an advertiser interface, core text associated with the advertisement and a client attribute the advertiser indicates warrants customizable text associated with the advertisement, wherein the core text is designated as a default message to present with the advertisement;

storing the core text, the first user attribute, the second user attribute, and the client attribute in at least one database in association with the advertisement;

determining, by a text authoring engine, that customization of the core text is not desirable for the second user based on the second user attribute failing to match the client attribute;

in response to the determining customization of the core text is not desirable for the second user, providing from the at least one database, over an internet network, the core text to a first computing device associated with the second user for presentation by a first user interface of the default message to the second user in association with the advertisement;

determining, by the text authoring engine, that customization of the core text is desirable for the first user based on the first user attribute matching the client attribute;

in response to the determining customization of the core text is desirable for the first user, dynamically generating, by the text authoring engine utilizing at least a portion of information stored in the at least one database, modified text in the customization by changing the text itself of the core text thereby modifying the default message and further customizing presentation of the core text; and providing, over the internet network, the modified core text to a second computing device associated with the first user for presentation by a second user interface of the modified default message to the first user in association with the advertisement.

2. The one or more computer storage memory hardware devices of claim 1, wherein the dynamically generating modified text comprises dynamically generating modified text utilizing the first user attribute.

3. The one or more computer storage memory hardware devices of claim 1, wherein the first user attribute comprises a geographic location of the first user and the client attribute comprises a geographic location of the advertiser, and wherein the client attribute is retrieved from an advertiser profile that is independent of content of the advertisement.

4. The one or more computer storage memory hardware devices of claim 1, wherein the first user attribute comprises one of a user behavior attribute, an environmental attribute, and a user demographic attribute.

5. The one or more computer storage memory hardware devices of claim 4, wherein the first user attribute comprises a user behavior attribute, and wherein the user behavior attribute comprises one of the first user's Internet browsing history, the first user's Internet search history, the first user's online purchasing history, the first user's online publishing history, the first user's online investment history, and the first user's online membership activities.

6. The one or more computer storage memory hardware devices of claim 4, wherein the first user attribute comprises an environmental attribute, and wherein the environmental attribute comprises one of a time of day, a day of week, a day of month, a month of year, a season, content of one or more active websites, and the first user's geographic location.

7. The one or more computer storage memory hardware devices of claim 4, wherein the first user attribute comprises a user demographic attribute, and wherein the user demographic attribute comprises one of the first user's age, the first user's gender, the first user's income, the first user's marital status, the first user's race, the first user's nationality, the first user's primary spoken language, the first user's interests, and the first user's occupation.

8. The one or more computer storage memory hardware devices of claim 1, wherein the client attribute comprises an advertiser attribute, and wherein the advertiser attribute comprises one of the advertiser's industry, the advertiser's geographic location, and the advertiser's target demographic associated with the advertisement.

9. The one or more computer storage memory hardware devices of claim 1, wherein the method further comprises: receiving information associated with target placement of the advertisement, and wherein the determining whether customization of the core text is desirable comprises determining, based on the first user attribute and the information associated with target placement of the advertisement, whether customization of the core text is desirable.

10. The one or more computer storage memory hardware devices of claim 1, wherein the method further comprises:
determining the first user's response to the presented modified text and advertisement; and
storing the first user's response as a user behavior attribute.

11. The one or more computer storage memory hardware devices of claim 3, wherein the method further comprises:
determining the first user's response to the presented modified core text and advertisement; and
storing the first user's response as a user behavior attribute.

12. One or more computer storage memory hardware devices having computer-executable instructions embodied thereon that, when executed, perform a method for dynamically generating text associated with an advertisement, the method comprising:

obtaining a first user attribute corresponding to online activity of a first user and a second user attribute corresponding to online activity of a second user;

receiving from an advertiser through an advertiser interface, core text associated with the advertisement and a client attribute the advertiser indicates warrants customizable text associated with the advertisement, wherein the core text is designated as a default message to present with the advertisement;

storing the core text, the first user attribute, the second user attribute, and the client attribute in at least one database in association with the advertisement;

determining, by a text authoring engine, that customization of the core text is not desirable for the second user based on the second user attribute failing to match the client attribute;

in response to the determining customization of the core text is not desirable for the second user, providing from the at least one database, over an internet network, the core text to a first computing device associated with the second user for presentation by a first user interface of the default message to the second user in association with the advertisement;

determining, by the text authoring engine, that customization of the core text is desirable for the first user based on the first user attribute matching the client attribute;

in response to the determining customization of the core text is desirable for the first user, dynamically generating, by the text authoring engine utilizing at least a portion of information stored in the at least one database, modified text in the customization by changing the text itself of the core text thereby modifying the default message and further customizing presentation of the core text; and providing, over the internet network, the modified core text to a second computing device associated with the first user for presentation by a second user interface of the modified default message to the first user in association with the advertisement.

13. The one or more computer storage memory hardware devices of claim 12, wherein the dynamically generating modified text comprises dynamically generating modified text utilizing the first user attribute.

14. The one or more computer storage memory hardware devices of claim 12, wherein the method further comprises receiving information associated with target placement of the advertisement, and wherein the determining whether customization of the core text is desirable comprises determining, based on the first user attribute and the information associated with target placement of the advertisement, whether customization of the core text is desirable.

15. The one or more computer storage memory hardware devices of claim 12, wherein the default message comprises place holder text surrounded by static text with respect to the advertisement and the changing the text itself of the core text comprises replacing the place holder text.

16. The one or more computer storage memory hardware devices of claim 12, wherein the dynamically generating modified text in the customization uses at least one natural language model.

17. The one or more computer storage memory hardware devices of claim 12, wherein the providing the core text to the second computing device for the presentation includes providing target placement information of the modified text for the presentation.

18. A computer-implemented system comprising:
one or more processors and one or more memory storing computer-executable instructions, that when executed cause the one or more processors to perform a method comprising:
obtaining a first user attribute corresponding to online activity of a first user and a second user attribute corresponding to online activity of a second user;
receiving from an advertiser through an advertiser interface, core text associated with an advertisement and a client attribute the advertiser indicates warrants customizable text associated with the advertisement, wherein the core text is designated as a default message to present with the advertisement;
storing the core text, the first user attribute, the second user attribute, and the client attribute in at least one database in association with the advertisement;
determining, by a text authoring engine, that customization of the core text is not desirable for the second user based on the second user attribute failing to match the client attribute;
in response to the determining customization of the core text is not desirable for the second user, providing from the at least one database, over an internet network, the core text to a first computing device associated with the second user for presentation by a first user interface of the default message to the second user in association with the advertisement;
determining, by the text authoring engine, that customization of the core text is desirable for the first user based on the first user attribute matching the client attribute;
in response to the determining customization of the core text is desirable for the first user, dynamically generating, by the text authoring engine utilizing at least a portion of information stored in the at least one database, modified text in the customization by changing the text itself of the core text thereby modifying the default message and further customizing presentation of the core text; and
providing, over the internet network, the modified core text to a second computing device associated with the first user for presentation by a second user interface of the modified default message to the first user in association with the advertisement.

19. The computer-implemented system of claim 18, wherein the dynamically generating modified text comprises dynamically generating modified text utilizing the first user attribute.

20. The computer-implemented system of claim 18, wherein the first user attribute comprises a geographic location of the first user and the client attribute comprises a geographic location of the advertiser, and wherein the client attribute is retrieved from an advertiser profile that is independent of content of the advertisement.

* * * * *